US006918099B2

(12) United States Patent
Subbarayan

(10) Patent No.: US 6,918,099 B2
(45) Date of Patent: Jul. 12, 2005

(54) METHOD AND SYSTEM FOR ENTROPY DRIVEN VERIFICATION

(75) Inventor: Saravanan Subbarayan, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 169 days.

(21) Appl. No.: 10/370,165

(22) Filed: Feb. 19, 2003

(65) Prior Publication Data

US 2004/0163059 A1 Aug. 19, 2004

(51) Int. Cl.[7] ............................................... G06F 17/50
(52) U.S. Cl. ..................... 716/4; 716/1; 716/5; 716/6; 716/12; 716/14; 702/120; 714/724
(58) Field of Search ................... 716/4–6, 12; 714/724; 703/23, 16; 702/120; 700/193; 348/192

(56) References Cited

U.S. PATENT DOCUMENTS

| | | | | |
|---|---|---|---|---|
| 5,313,469 | A | * 5/1994 | Adham et al. ............... | 714/724 |
| 5,732,247 | A | 3/1998 | Dearth et al. ............... | 395/500 |
| 6,052,809 | A | * 4/2000 | Bowden ...................... | 714/738 |
| 6,470,480 | B2 | 10/2002 | Ganesan et al. .............. | 716/4 |
| 6,480,800 | B1 | * 11/2002 | Molyneaux et al. ......... | 702/120 |
| 6,484,135 | B1 | * 11/2002 | Chin et al. ..................... | 703/23 |
| 6,594,803 | B1 | * 7/2003 | Weber et al. .................. | 716/5 |
| 6,842,883 | B2 | * 1/2005 | Whitehill ....................... | 716/4 |
| 2001/0010091 | A1 | * 7/2001 | Noy .............................. | 716/4 |
| 2002/0065640 | A1 | * 5/2002 | Ramsey ....................... | 703/16 |
| 2003/0046645 | A1 | * 3/2003 | Boehm .......................... | 716/5 |

OTHER PUBLICATIONS

Marculescu et al., "Information theoretic measures for power analysis [logic design]", Jun. 1996, Computer–Aided Design of Integrated Circuits and Systems, IEEE Transactions on , vol. 15 , Issue: 6 , pp.: 599–610.*

Kaderka et al., "Neural network based system for testing and diagnostics of analogue integrated circuits", Oct. 13–16, 1996 ,Electronics, Circuits, and Systems, ICECS, Proceedings of the Third IEEE International Conference on , vol. 2 , pp. 1198–1201.*

Pei–Hsin et al., "Smart simulation using collaborative formal and simulation engines", Nov. 5–9, 2000, Computer Aided Design, 2000. ICCAD–2000. IEEE/ACM International Conference on , □□pp.: 120–126.*

Ziv et al, "Stimuli generation with late binding of values", Feb. 16–20, 2004 , Design, Automation and Test in Europe Conference and Exhibition, 2004. Proceedings , vol.: 1 , pp.: 558–564.*

Fine et al., "Enhancing the control and efficiency of the covering process [logic verification]", Nov. 12–14, 2003, High–Level Design Validation and Test Workshop, 2003. Eighth IEEE International , pp. 96–101.*

(Continued)

*Primary Examiner*—A. M. Thompson
*Assistant Examiner*—Helen Rossoshek
(74) *Attorney, Agent, or Firm*—Hamilton & Terrile, LLP; Robert W. Holland

(57) ABSTRACT

A microelectronic device design verification system and method estimates the entropy of stimuli communicated over an interface to verify a microelectronic device design and feeds back the estimated entropy to alter the generation of stimuli to improve the design state space verified by additional stimuli applied to the microelectronic device design. For instance, predetermined factors used for random or directed generation of stimuli are altered based on the estimated entropy of stimuli communicated over an interface to a microelectronic device design software model or hardware integrated circuit implementation. The predetermined factors are adjusted so that subsequent stimuli has a desired impact on the estimated entropy, such as an increase in entropy that indicates a more complete microelectronic device design verification.

20 Claims, 2 Drawing Sheets

OTHER PUBLICATIONS

Huertas et al., "Test and design–for–test of mixed–signal integrated circuits", Sep. 7–11, 2004, Integrated Circuits and Systems Design, SBCCI 2004. 17th Symposium on , p. 4.*

Fallah et al., "OCCOM: efficient computation of observability–based code coverage metrics for functional verification", Jun. 15–19, 1998, Design Automation Conference, 1998. Proceedings , pp.: 152–157.*

Wang et al., "Design and test of mixed–signal VLSI", Sep. 14–17, 1993, Electrical and Computer Engineering, 1993. Canadian Conference on , pp.: 461–464 vol. 1.*

Grzechca et al., "Use of neural network and fuzzy logic to time domain analog tasting", Nov. 18–22, 2002, Neural Information Processing, 2002. ICONIP '02. Proceedings of the 9th International Conference on , vol. 5 , pp.: 2601–2604 vol. 5.*

Kang et al., "Automatic error pattern generation for design error detection in a design validation simulation system", Sep. 21–25, 1992, ASIC Conference and Exhibit, 1992., Proceedings of Fifth Annual IEEE International , pp.: 533–536.*

Grzechca, Damain; Rotkowski, Jerzy "Use of Neural Network and Fuzzy Logic to Time Domain Analog Tasting" Proceedings of the $9^{th}$ International Conference on Neural Information Processing (ICONIP '02), vol. 5, pp. 2601–2604.

Fallah, Farzan; Devadas, Srinivas; Keutzer, Kurt "OCCOM– Efficient Computation of Observability–Based Code Coverage Metrics for Functional Verification" IEEE Transactions on Computer–Aided Design of Integration Circuits and Systems, vol. 20, No. 8, Aug. 2001 pp. 1003–1015.

Kang, Sungho; Szygenda, Stephen "Automatic Error Pattern Generation for Design Error Detection in a Design Validation Simulation System" IEEE Feb. 1992, pp. 533–536.

Wang, Francis "Design and Test of Mixed Signal VLSI" IEEE 1993, CCECE/CCGEI 1993.

Jordan, Edward C. "Reference Data for Engineers: Radio, Electronics, Computer and Communications" Chapter 25, Information Theory and Coding, pp. 25–8 through 25–22, Seventh Edition 1989.

* cited by examiner

METHOD AND SYSTEM FOR ENTROPY DRIVEN VERIFICATION

BACKGROUND OF THE INVENTION

1. Field of the Invention

The present invention relates in general to the field of microelectronic device verification, and more specifically to a method and system for entropy driven verification of a microelectronic device design.

2. Description of the Related Art

Microelectronic device designs typically undergo a rigorous verification process before general commercial release. Initial high-level designs specify circuits to perform designed functions, such as generating a predetermined output for a given input. Automated tools then generally take the high-level designs to create a low-level design, such as with gates and transistors fabricated in a semiconductor material. Upon completion of the low-level design, the microelectronic device design is then typically verified with computer simulations and with hardware implementations of the microelectronic device design as an integrated circuit. In the computer simulation environment, predetermined stimulus is applied to a computer model of the low-level design and the simulated output generated by the stimulus is examined to determine that the microelectronic device design performs the designed function, such as by outputting an expected response to the stimulus. In a hardware verification, electrical signal stimuli are input into an integrated circuit having the microelectronic device design and the output response is compared with an expected response to verify that the integrated circuit operates as designed.

Verification of microelectronic device designs is often a complex and time-consuming process. Integrated circuits have grown increasingly complex and typically have millions of transistors that perform a myriad of functions. Complete design specification and complete verification are often not practical, particularly with complex integrated circuits and tight commercial release dates. Instead, verification generally relies on directed stimuli generated to verify selected functions and random stimuli over a limited duration generated to verify as much of the design state space as practical. Random generation typically uses weights that affect the values of randomly generated stimuli and allows some directed coverage of desired design state space. A combination of directed and random verification testing along with the design state space covered by the verification testing allows an estimation of the stability of the microelectronic device design. Stability determinations generally grow more accurate as the time for application of random stimuli increases; however, even extensive random verification cannot guarantee the status of a microelectronic device design.

SUMMARY OF THE INVENTION

In accordance with the present invention, a method and system are provided for entropy driven verification of a microelectronic device design that accelerates the verification process to achieve a more complete coverage of a design state space in a reduced time. A feedback loop estimates the status of explored areas in a design state space and adjusts stimuli generation to converge on uncovered areas. More specifically, an entropy estimator estimates the entropy of a communication interface that communicates stimuli and responses between a simulation engine and a test engine. An entropy feedback engine uses the estimated entropy to adjust the stimuli output by simulation engine to have a desired effect on the estimated entropy. The estimated entropy provides a measure of design state space coverage by estimating the probability mix of instructions for the stimuli communicated over the interface to the test engine. The entropy feedback engine converges verification coverage to unexplored areas of the design state space by adjusting predetermined factors of random generation or direct stimuli engines so that subsequent stimulus from these stimuli engines increases entropy, thus resulting in a greater probability mix of instructions represented by the stimuli communicated over the communication interface. By adjusting stimuli to have a desired effect on estimated entropy, the feedback loop accelerates verification coverage and provides a more complete verification for a given time period.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
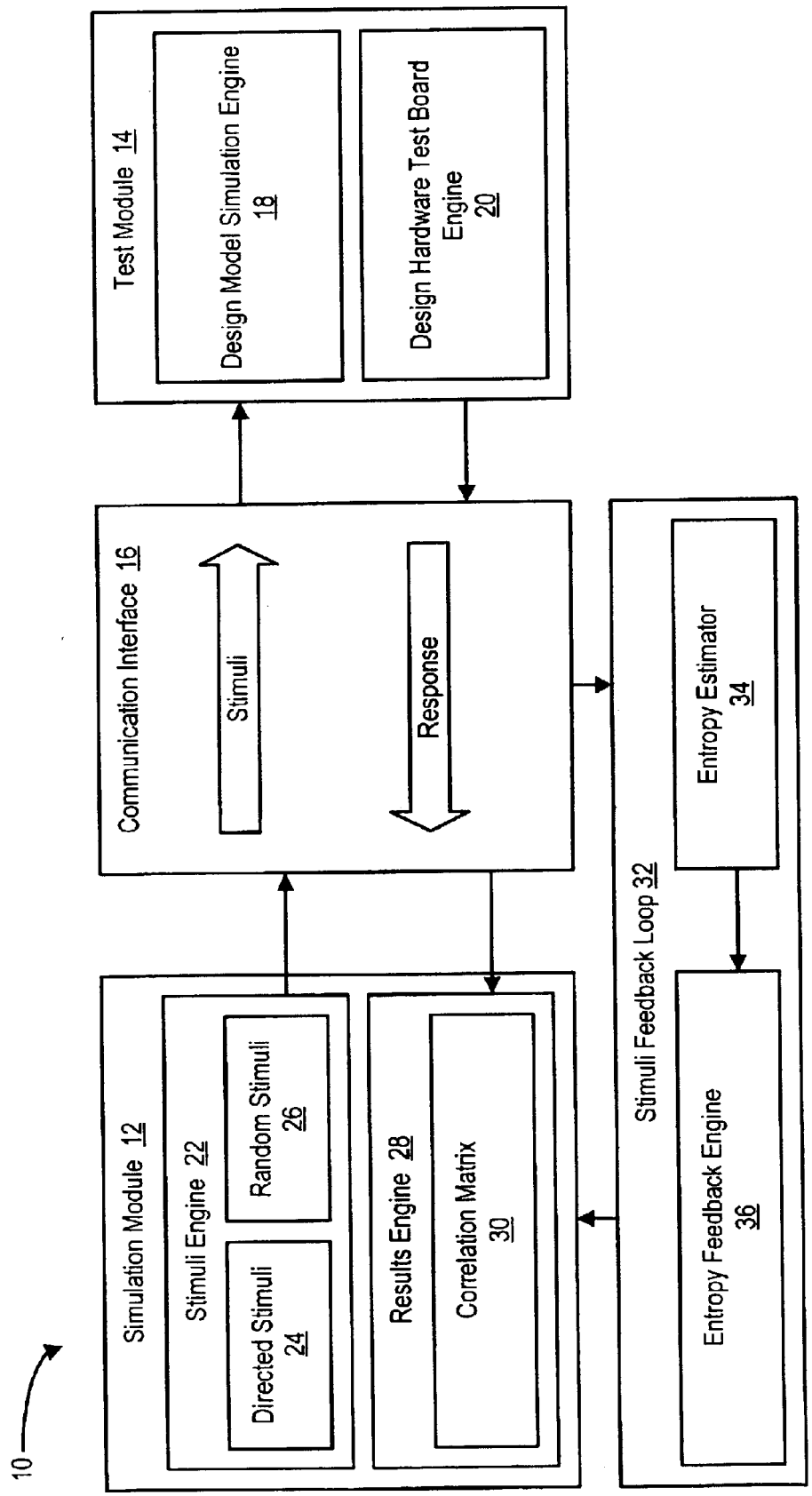
FIG. 1 depicts a block diagram of a system for adjusting stimuli generation based on estimated interface entropy.

Microelectronic device design verification attempts to identify errors by applying stimuli to a simulation or integrated circuit embodying the design and comparing the response of the simulation or integrated circuit with an expected response. Specific design state spaces are covered with directed verification that seeks to apply stimuli that uses selected functions of the microelectronic device design. Other design state spaces are covered with random verification that seeks to apply randomly generated stimuli to other functions of the microelectronic device design. The stability of the microelectronic device design is estimated from the detected errors and the verification coverage. With more complex microelectronic device designs, large numbers of randomly generated stimuli are generally applied in order to obtain an estimate of stability having reasonable reliability, however, verification with large numbers of randomly generated stimuli is a time consuming process. The present invention accelerates the verification process by estimating in real time the coverage of stimuli for the microelectronic device design state space and adjusting the generation of stimuli to cover unexplored design state space.

Microelectronic devices accept stimuli through input interfaces and output results for the stimuli through output interfaces. Typically, input and output interfaces are physical wires that transmit electronic signals to and from a microelectronic device or that transmit signals within blocks, such as FSMs. The present invention models input or output interfaces as communication channels and evaluates the coverage of stimuli or results from stimuli by evaluating the interface entropy as a communication channel. Entropy of an interface is estimated at an arbitrary starting point based on an initial simulation and then entropy randomization from the initial simulation is adjusted with observed entropy estimations, either with random adjustments, previously recorded simulation runs, predetermined algorithms or new arbitrary starting conditions.

In one embodiment, design state space covered by stimuli is measured by estimating the entropy of a communication interface that provides the stimuli to a test engine, and convergence on uncovered design state space is accomplished by adjusting random generation weights so subsequent randomly-generated stimuli increases the entropy of the communication interface. The concept of entropy in communication theory is a measurement of the average information or uncertainty associated with an interface. For a source output $a_j$ that occurs with probability $p(a_j)$, the average amount of information per symbol selection or entropy H(p) is stated by the equation:

$$H(p) = -\sum_{j=0}^{J-1} p(a_j) \log 2\, p(a_j) \text{ bits/symbol}$$

Estimated entropy for a communication interface between a stimuli source and a test engine provides a measure of the probability mix of instructions of the stimuli to the microelectronic device design. In order to provide accelerated design state space coverage, a feedback loop uses estimated entropy of the communication interface to adjust stimuli generation. For instance, random generation weights are adjusted to provide stimuli that increases the communication interface estimated entropy, thus providing an increased probability mix of instructions applied to the microelectronic device design.

Referring now to FIG. 1, a block diagram depicts a verification system 10 for adjusting stimuli generation based on estimated entropy to adjust verification design state space coverage for a microelectronic device design. A simulation module 12 generates stimuli for application to a microelectronic device design and compares the actual response of the microelectronic device design to the stimuli against an expected response to detect errors. Test stimuli and responses are communicated between simulation module 12 and a test module 14 over a communication interface 16. Test module 14 includes hardware or software embodiments of the microelectronic device design to test the response of the hardware or software design to the stimuli. For instance, a design model simulation engine 18 applies stimuli to a software model of the microelectronic device design, and a design hardware test board engine 20 applies stimuli to an integrated circuit that embodies the microelectronic device design.

Simulation module 12 generates stimuli with a stimuli engine 22 and compares the actual and expected response of the microelectronic device design to the stimuli with a results engine 28. A directed stimuli engine 24 generates directed stimuli for directed testing and a random stimuli engine 26 generates random stimuli for communication to test module 14 through communication interface 16. Directed testing uses predetermined factors to generate stimuli directed to the testing of specific functions of a microelectronic device design. For instance, directed testing may be used to ensure proper functioning of design specifics that are more commonly subject to failure or that otherwise raise concerns during verification. Random testing uses predetermined factors, such as random generation weights, to generate random stimuli meant to provide random coverage of design state space. For instance, alterations to random generation weights results in changes in design state space coverage of the stimuli randomly generated. Results engine 28 accepts the actual response of the microelectronic device design from test module 14 through communication interface 16 and compares the actual response with an expected response to the applied stimuli. For instance, a correlation matrix 30 correlates actual and expected responses and identifies errors if an actual response differs from an expected response.

Over time, direct and randomly generated stimuli test microelectronic device design state space to detect errors. However, direct and randomly generated stimuli cannot guarantee complete coverage of design state space or coverage of areas of concern for a given design. In order to measure coverage of stimuli applied to a microelectronic device design, a stimuli feedback loop 32 estimates coverage provided by information communicated over communication interface 16 and adjusts the predetermined factors of directed stimuli engine 24 and random stimuli engine 26 to obtain a desired coverage. For instance, stimuli sent from stimuli engine 22 is observed as it passes through communication interface 16 and the observation is used to estimate design state space coverage provided by the stimuli. The estimate of design state coverage is used to calculate adjustments to predetermined factors, such as random generation weights, to coax coverage of desired design state space. In addition or as an alternative, stimuli feedback loop 32 estimates design state space coverage from responses of the microelectronic device design to the stimuli and adjusts the predetermined factors to coax coverage of desired design state space from a response view. Estimates of coverage of design state space are made based on data or signals across communication interface 16, such as simulation data associated with testing of design model simulation engine 18 or electrical signals associated with testing of design hardware, such as an integrated circuit that embodies the microelectronic device design.

Stimuli feedback loop 32 estimates design state space coverage of applied stimuli by analyzing communication interface 16 as a communication channel. Communication channel 16 is analyzed with an entropy function that estimates the average information or uncertainty of communication interface 16 to maximize the number of stimuli bits applied to the microelectronic device design, thus improving coverage. An entropy estimator 34 estimates the entropy of communication interface 32 to provide a quantification of the probability mix of instructions sent as stimuli through communication interface 16. An entropy feedback engine 36 calculates adjustments to the predetermined factors or directed stimuli engine 24 or random stimuli engine 26 to achieve or maintain a desired entropy, thus providing a desired probability mix of instructions. For instance, entropy feedback engine 36 calculates adjustments to the predetermined factors to attempt to increase or maximize the entropy estimated by entropy estimator 34 in order to increase or maximize the amount of information represented by stimuli communicated over communication interface 16. In one embodiment, entropy estimator 34 and entropy feedback engine 36 are implemented with one or more neural networks. Stimuli feedback loop 32 may cross correlated entropy estimations with coverage indicated by correlation matrix 30. The increased probability mix of instructions associated with increased entropy improves design state space coverage in a reduced time. The implementation of a feedback loop to adjust the entropy of communication interface 16 coaxes the generation of stimuli that converges on uncovered design state space.

Figure 2:
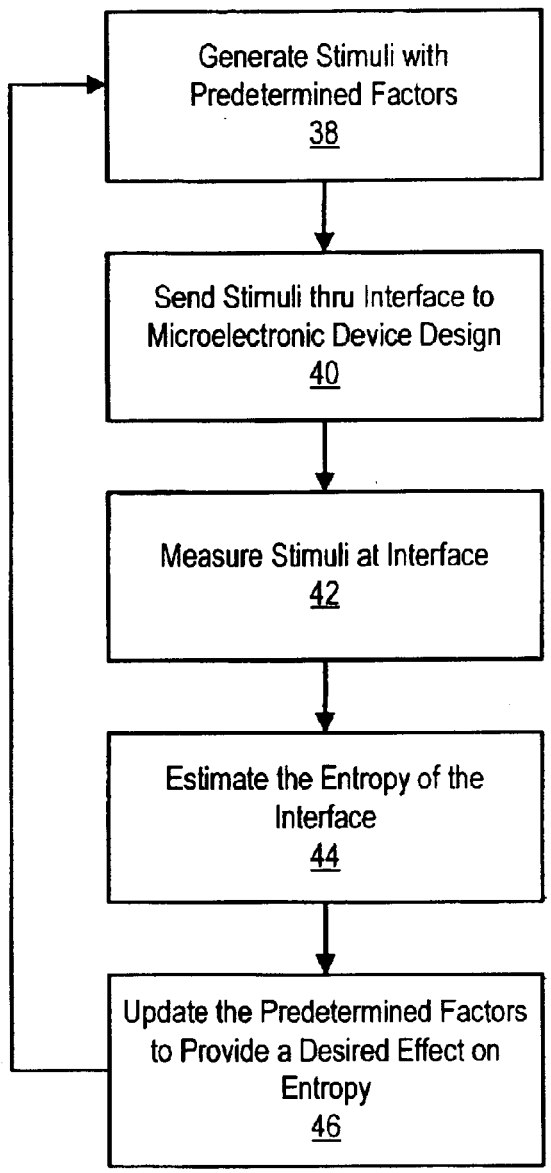
FIG. 2 depicts a flow diagram of a process for adjusting stimuli generation based on estimated interface entropy.

Referring now to FIG. 2, a flow diagram depicts a process for adjusting stimuli generation based on an estimated entropy of communication interface 16. The process begins at step 38 with the generation of stimuli using predetermined factors for application to microelectronic device design implemented with a model simulation or integrated circuit.

The generated stimuli may include random and direct stimuli generated with the predetermined factors set to cover a predetermined design state space. At step 40, the stimuli is applied to the microelectronic device design through communication interface 16 to generate a response. The verification of the microelectronic device design is accomplished by the return of actual responses that are valid for the applied stimuli.

At step 42, the stimuli is measured at communication interface 16, such as by reading data or measuring signals transferred through communication interface 16. At step 44, the entropy of communication interface 16 is estimated, such as by applying the read data or measured signals to a neural network. The estimated entropy may include all stimuli communicated across communication interface or stimuli from a selected test period. For instance, the estimated entropy may include directed and random stimuli to estimate the overall probability mix of instructions applied to the microelectronic device or may instead estimate just random stimuli or random stimuli from a defined time period that are associated with selected random generation weights. At step 46, the predetermined factors associated with the generation of the stimuli are adjusted to provide a desired effect on the entropy of communication interface 16. For instance, random weights are adjusted to increase entropy, thus resulting in improved coverage of design state space. The process then returns to step 38 for the generation of stimuli with the updated predetermined factors. As the number of iterations increases, the estimated entropy provides a quantification of design state space coverage provided by the stimuli communicated over communication interface 16.

Stimuli feedback loop 32 provides a feedback path that improves design state space coverage for random tools by using estimated coverage to alter random generation of stimuli and allows leveraging of existing directed stimuli suites for coverage of desired design state space. The use of real time estimates of entropy to update factors for generation of stimuli accelerates design state coverage by estimating the status of explored areas in design state space and generating stimuli that converges coverage to unexplored areas. In this manner, both model simulation and integrated circuit verification of a microelectronic device design are completed more quickly and with improved diagnostics of errors. Further, regression results of a given microelectronic device design are estimated not just on pass and fail results, but also entropy which quantifies design state space coverage.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for verification of a microelectronic device design, the system comprising:

a simulation engine operable to generate stimuli to apply to the microelectronic device design, the stimuli generated according to one or more predetermined factors;

a test engine operable to apply the stimuli to the microelectronic device design to produce a response;

a results engine operable to compare the test engine response to an expected stimuli response to detect microelectronic device errors;

a communication interface operable to communicate stimuli from the simulation engine to the test engine and to communicate test engine responses to the stimuli from the test engine to the results engine;

an entropy estimator interfaced with the communication interface, the entropy estimator operable to estimate an entropy associated with the communication interface; and an entropy feed back engine interfaced with the entropy estimator and the simulation engine, the entropy feed back engine operable to alter the predetermined factors based on the estimated entropy to generate a desired stimulus.

2. The system of claim 1 wherein the simulation engine comprises a random stimuli generator and the predetermined factors comprise random generation weights, the entropy feedback engine operable to alter one or more predetermined weights to generate stimulus having a desired effect on the estimated entropy.

3. The system of claim 2 wherein the entropy feedback engine alters the predetermined weights to maximize estimated entropy.

4. The system of claim 1 wherein the entropy estimator comprises a neural network.

5. The system of claim 1 wherein the entropy is estimated from the stimuli communicated through the communication channel.

6. The system of claim 1 wherein the entropy is estimated from the responses communicated through the communication channel.

7. The system of claim 2 wherein the simulation engine further comprises a directed stimuli generator.

8. The system of claim 1 wherein the microelectronic device design is embodied in an integrated circuit and the stimuli comprises electronic signals.

9. The system of claim 1 wherein the microelectronic device design is embodied in a model simulation of an integrated circuit.

10. A method for verification of a microelectronic device design, the method comprising:
generating stimuli according to one or more predetermined factors;
communicating the stimuli to the microelectronic device design through an interface;
estimating the entropy of the interface; and
altering the predetermined factor to have a desired estimated entropy.

11. The method of claim 10 further comprising:
applying the stimuli to the microelectronic device design to generate a response; and
comparing the response to an expected response to detect microelectronic device design errors.

12. The method of claim 11 wherein the microelectronic device design comprises a model simulation.

13. The method of claim 11 wherein the microelectronic device design comprises an integrated circuit.

14. The method of claim 11 further comprising:
communicating the response to the stimuli through the interface; and
estimating the entropy of the interface with the stimuli and the response.

15. The method of claim 10 wherein estimating the entropy further comprises estimating the entropy with a neural network model.

16. The method of claim 10 wherein generating stimuli further comprises generating stimuli with a random stimuli generator.

17. The method of claim 10 wherein generating stimuli further comprise generating stimuli with a directed stimuli generator.

18. A method for verifying a microelectronic device design, the method comprising:
generating stimuli with one or more predetermined factors, the stimuli for application to the microelectronic device design;
communicating the stimuli to the microelectronic device design;
measuring the stimuli communicated to the microelectronic device design to estimate the design state space of the microelectronic device design verified by the stimuli; and
altering the predetermined factors based on the measured stimuli to verify desired microelectronic design state space.

19. The method of claim 18 wherein measuring the stimuli comprises estimating the entropy of an interface that communicates the stimuli to the microelectronic device.

20. The method of claim 18 wherein generating stimuli comprises random generation of stimuli.

* * * * *